United States Patent [19]

Ing-Simmons et al.

[11] Patent Number: 5,237,672
[45] Date of Patent: Aug. 17, 1993

[54] DYNAMICALLY ADAPTABLE MEMORY CONTROLLER FOR VARIOUS SIZE MEMORIES

[75] Inventors: Nicholas K. Ing-Simmons; Iain C. Robertson, both of Bedford, England

[73] Assignee: Texas Instruments Incorporated, Dallas, Tex.

[21] Appl. No.: 386,936

[22] Filed: Jul. 28, 1989

[51] Int. Cl.$^5$ .............................................. G06F 12/06
[52] U.S. Cl. ................................... 395/425; 395/400; 364/DIG. 1; 364/243.1; 364/243.7; 364/245.31
[58] Field of Search ........................... 395/425, 400; 364/900 MS File, 200 MS File

[56] References Cited

U.S. PATENT DOCUMENTS

| | | | |
|---|---|---|---|
| 4,234,934 | 11/1980 | Thorsrud | 395/400 |
| 4,571,676 | 2/1986 | Mantellina et al. | 395/425 |
| 4,649,511 | 3/1987 | Gdula | 364/900 |
| 4,675,808 | 6/1987 | Grinn et al. | 395/400 |
| 4,744,025 | 5/1988 | Lipcon et al. | 395/425 |
| 4,760,522 | 7/1988 | Weatherford et al. | 395/425 |
| 4,809,234 | 2/1989 | Kuwashiro | 365/230.03 |
| 4,860,252 | 8/1989 | Sykora | 395/400 |
| 4,888,687 | 12/1989 | Allison et al. | 395/425 |
| 4,908,789 | 3/1990 | Blokkum et al. | 364/900 |
| 4,951,248 | 8/1990 | Lynch | 395/425 |
| 4,980,850 | 12/1990 | Morgan | 395/425 |

OTHER PUBLICATIONS

Mano, "Computer System Architecture", Second edition, 1982, pp. 59-62.

*Primary Examiner*—Joseph L. Dixon
*Assistant Examiner*—Hiep T. Nguyen
*Attorney, Agent, or Firm*—Robert D. Marshall, Jr.; James C. Kesterson; Richard L. Donaldson

[57] ABSTRACT

There is disclosed a system and method for operating a memory controller in a manner which will allow memories with differing address sizes to be connected to a common bus. The controller decodes address information to change from a determined default address size to another address size on a dynamic basis during the actual memory access cycle. Upon detection of larger memory size, an adjustment occurs in the presentation of address information on the common address bus.

6 Claims, 2 Drawing Sheets

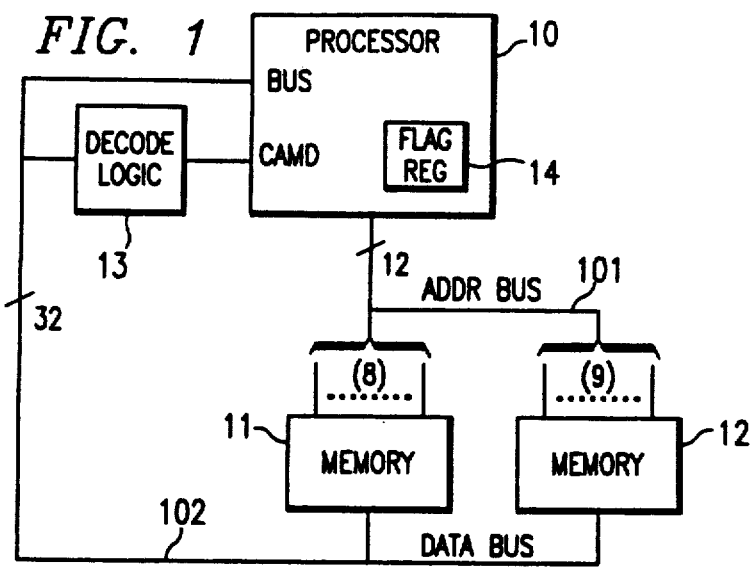
FIG. 1
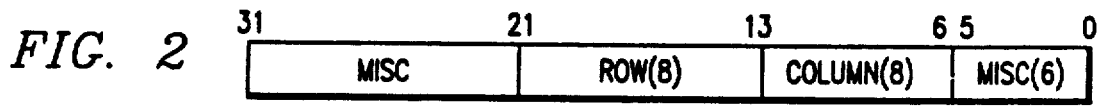
FIG. 2
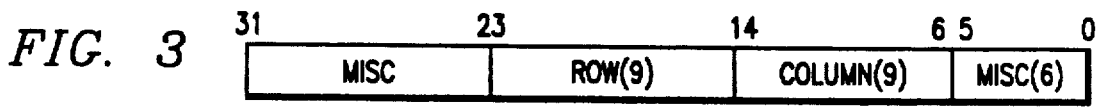
FIG. 3
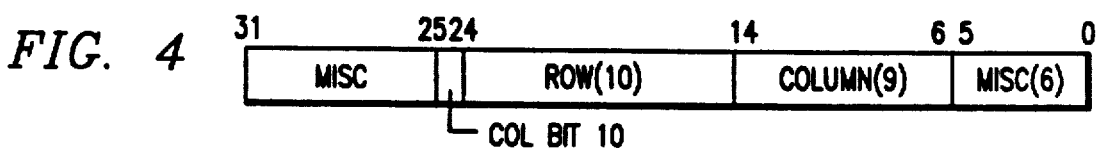
FIG. 4
FIG. 5

PHYSICAL CONNECTIONS TO THE ADDRESS BUS

| | | | |
|---|---|---|---|
| 9 LEADS (DEFAULT) | ROW | 26 25 24 23 22 21 20 19 18 17 16 15 | |
| | | 8 7 6 5 4 3 2 1 0 | MEMORY INPUTS |
| | COLUMN | 16 15 14 13 12 11 10 9 8 7 6 | |
| 10 LEADS | ROW | 26 25 24 23 22 21 20 19 18 17 16 15 | |
| | | 9 8 7 6 5 4 3 2 1 0 – | MEMORY INPUTS |
| | COLUMN | 27 15 14 13 12 11 10 9 8 7 6 | |
| 11 LEADS | ROW | 26 25 24 23 22 21 20 19 18 17 16 15 | |
| | | 10 9 8 7 6 5 4 3 2 1 0 – | MEMORY INPUTS |
| | COLUMN | 27 15 14 13 12 11 10 9 8 7 6 | |

*FIG. 6*

DYNAMICALLY ADAPTABLE MEMORY CONTROLLER FOR VARIOUS SIZE MEMORIES

TECHNICAL FIELD OF THE INVENTION

This invention relates to memory controllers and more particularly to a memory controller which allows various size memories to be addressed without requiring external multiplexing of the address information for each of the differing memory sizes.

CROSS REFERENCE TO RELATED APPLICATIONS

All of the following patent applications are cross-referenced to one another, and all have been assigned to Texas Instruments Incorporated. These applications have been concurrently filed and are hereby incorporated in this patent application by reference.

| Serial Number | Title |
| --- | --- |
| 07/387,568 | Video Graphics Display Memory Swizzle Logic and Expansion Circuit and Method |
| 07/387,567 | Video Graphics Display Memory Swizzle Logic and Expansion Circuit and Method |
| 07/387,459 | Graphics Floating Point Coprocessor Having Matrix Capabilities |
| 07/387,242 | Graphics Processor Trapezoidal Fill Instruction Method and Apparatus |
| 07/387,600 | Graphic Processor Three-Operand Pixel Transfer Method and Apparatus |
| 07/387,199 | Graphics Processor Plane Mask Mode Method and Apparatus |
| 07/386,936 | Dynamically Adaptable Memory Controller For Various Size Memories |
| 07/387472 | Graphics Processor Having a Floating Point Coprocessor |
| 07/387,553 | Register Write Bit Protection Apparatus and Method |
| 07/387,569 | Graphics Display Split-Serial Register System |
| 07/387,455 | Multiprocessing Multiple Priority Bus Request Apparatus and Method |
| 07/387325 | Processing System Using Dynamic Selection of Big and Little Endian Coding |
| 07/386057 | Graphics Processor Nonconfined Address Calculation System |
| 07/386850 | Real Time and Slow Memory Access Mixed Bus Usage |
| 07/387,479 | Graphics Coprocessor Having Imaging Capability |
| 07/387,255 | Graphics Floating Point Coprocessor Having Stand-Alone Graphics Capability |
| 07/387243 | Graphics Floating Point Coprocessor Having Vector Mathematics Capability |
| 07/386849 | Improvements in or Relating to Read-Only Memory |
| 07/386,266 | Method and Apparatus for Indicating When a Total in a Counter Reaches a Given Number |

BACKGROUND OF THE INVENTION

Random access memories (RAMs) typically come in standard presized building block packages. These packages are addressable over a set of address leads, which leads, in turn, are connected to an address bus. In a typical graphics processing system, several different types of memories may be employed, some having 8 leads and some having 9, 10 or 11 leads. As technology changes, the number of addressing leads will continue to change also.

The address cycle of a typical processing system accesses the memory by providing an address having perhaps 32 bits. Some of the bits refer to the row address and some of the bits refer to the column address. To conserve space on the memory, the same leads are used for both the row and the column address information. This can be so since a time multiplexing scheme is used whereby first the bits from the bus corresponding to the row address are clocked to the memory and then the bits on the bus corresponding to the column are clocked to the memory. This works since the positions in the bus word where the row and column bits are located are fixed and thus the leads can be permanently associated with the proper corresponding address bit.

This system works fine, except when the same processor and bus handle memories having different numbers of address leads. The problem is as follows. Assume that both an 8-bit and a 9-bit address memory are connected to a common bus. Assume also that bits 0–7 of the address represent the column address for the 8-bit memory with bits 8–15 representing the row address. Under this condition the memory leads would be connected to the bus such that address bits 0 and 8 (through appropriate logic circuits) would be connected to memory lead 0 and address bits 1 and 9 connected to memory lead 1. Thus, address bits 7 and 15 would be connected through buffers, to memory lead 7.

Now assume that the 9-bit memory uses address bits 0–8 for the column address and bits 9–17 for the row address. The memory, following traditional logic, would be wired to the bus as discussed above such that in this fashion address bits 0 and 9 would go to memory lead 0 while address bits 8 and 17 would go to memory lead 8.

Now comes an 8 bit address directed to the 8-bit memory. The row portion typically comes during the first phase of the write cycle, so address bits 8–15 are gated into memory via memory leads 0–7. During the next phase of the memory cycle, address bits 0–7 are gated to memory, also on memory leads 0–7. There is no problem so far since all of the possible combinations of addresses on the 8-bit address are uniquely associated with a different memory lead, or with the same lead at different times. The memory is accessed properly and can be fully utilized.

Now comes a 9 bit address directed to the 9 bit memory. The row portion comes first and is presented to the memory on memory inputs 0–8. However, at this time the processor has not determined if the address is an 8 bit or 9 bit address. Thus, unless some special action were to be taken, address bits 8–16 (the same as before with one added) would be presented to memory leads 0–8. Address bit 8, however is, as discussed above, actually part of the 9 bit column address. Thus, problems result when a system attempts to concurrently use memories having different addressing capabilities.

In the prior art, in order to accomplish addressing to different size memories in the same system, complex external multiplexing logic is required.

Thus a need exists in the art for an arrangement which will allow a single bus to contain the addresses for various size RAMs, with only a minimum of external logic.

SUMMARY OF THE INVENTION

There is arranged a graphic presentation system having both video RAMs and dynamic RAMs served by the same bus, each RAM having different addressing capability. This is accomplished by recognizing that each RAM has two parts to its address, namely a row word and a column word. It is also recognized that the row word comes early in the cycle and, based upon decoding during the row addressing phase a proper selection of memory can be made. Our arrangement is established based upon the size of one of the memories, namely the video memory, being established and controlled by flag bits set immediately following reset of the system. Thus, once the system is powered on, the system knows what size video RAM is in place and thus creates the size of the default row and column address for that size RAM. All other memories are connected to the bus with their input leads shifted one or more positions prior to physically being connected to the bus. This shifting of positions allows for the row address to be presented as it always is on the leads proper for the default memory size. Upon decoding during the row address phase, the decoding logic will provide a signal over the CAMD (Column Address Mode) lead to the processor so that the processor can determine if a memory other than the default memory is being accessed and can then shift the column address in accordance with the preadjusted physical connections to the bus.

The address subset output at column address time is thus determined dynamically on a cycle-by-cycle basis by the column address mode pin. This allows RAMs of different sizes to coexist within the same system, still without the need for external multiplexing hardware. Based upon initialization after reset the system knows what the default size RAM is. So thus, when the CAMD lead is 0, the logical address size for the RAM is established to be the default RAM size. On the other hand, if the CAMD lead is 1, the logical address size for the RAM is established to be greater than the default RAM size. These sizes are determined by the displacement between the logical address bit output on any given pin at row address time and the logical address bit output on the same pin at column address time.

It is a technical advantage of this invention to allow a common bus to serve several different RAM sizes without requiring complex external multiplexing logic. The system allows row addresses to come first and be presented to the bus in their normal position. Flag bits are set to determine the default RAM size. Decoding logic is used to control the CAMD lead, thereby adjusting the column address positioning on the bus to coincide with preselected connections to the bus.

BRIEF DESCRIPTION OF THE DRAWINGS

For a more complete understanding of the present invention and further advantages thereof, reference is now made to the following Detailed Description, taken in conjunction with the accompanying Drawings, in which:

FIG. 1 shows a typical graphics processor system in accordance with the inventive concept;

FIGS. 2, 3, and 4 show possible column and row address configurations for different size address blocks;

FIG. 5 is a chart showing the physical connections to the address bus; and

FIG. 6 is a chart of a nine-input memory default.

DETAILED DESCRIPTION OF THE INVENTION

Before beginning the detailed discussion of the operation of the invention, it will be helpful for a vender unfamiliar with graphic systems to briefly review the operation of such a system. A complete detailed discussion of a graphic processing system can be found in patent application Ser. No. 426,480 filed Oct. 23, 1989 entitled "Programmable Data Processing System and Apparatus for Executing Both General Purpose Instructions and Special Purpose Graphic Instructions", a continuation of patent application Ser. No. 346,388, filed Apr. 27, 1989, now abandoned, a continuation of patent application Ser. No. 207,034 file Jun. 13, 1988 now abandoned, a continuation of patent application Ser. No. 821,641 filed Jan. 23, 1986 now abandoned, and assigned to the assignee of this application. The aforementioned application is hereby incorporated by reference. Also incorporated herein by reference is Texas Instruments Inc. User's Guides TMS 34010 and 34020 and Specification TMS 34020/TMS 34082, both of which documents are currently available to the general public from Texas Instruments Inc.

For convenience and ease of understanding the inventive concepts taught herein there has been no attempt to show each and every operation and data movement since the actual embodiment of the invention in a system will, to a large degree, depend upon the actual system operation in which the inventive concept is embodied.

The address cycle of a typical processing system accesses the memory by providing an address having, perhaps 32 bits. Some of the bits as shown in FIGS. 2, 3 and 4 refer to the row address and some of the bits refer to the column address. To conserve space on the memory, the same leads are used for both the row and the column address information. This can be so since a time multiplexing scheme is used whereby first the bits from the address corresponding to the row address are clocked to the memory and then the bits of the address corresponding to the column are clocked to the memory. This works since the positions in the address where the row and column bits are located are fixed and thus the leads can be permanently associated with the proper corresponding address bits.

FIG. 1 shows an overview of a simplified graphics presentation system processor 10 controlling the system. The system has memory 11 shown with 8 address lead inputs and memory 12 with 9 memory address lead inputs. These inputs are connected to address bus 101 which in turn is connected to processor 10. Also connected to memories 11 and 12 is data bus 102 which in this example is a 32-bit bus which also is connected to processor 10. Connected to data bus 102 is decode logic 13 which also accepts inputs directly from processor 10. Processor 10 also contains flag register 14 which can be any type of register operable to hold one or more digits to control a particular state of the machine. An example of such a register is shown in the concurrently filed co-pending application entitled "Register Write Bit Protection Apparatus and Method", Ser. No. 387,553 which application is hereby incorporated by reference herein.

Memories 11 and 12 are addressable over a set of address leads, which leads, in turn, are connected to address bus 101. In a typical graphics processing system, several different types of memories may be employed, some having 8 leads and some having 9, 10 or 11 leads, or even more leads.

Turning now to FIG. 2, there is shown a multi-bit word for presentation on both the address bus and data bus. This word has some miscellaneous bits 0 through 5, eight column bits in positions 6 through 13 and eight row bits in positions 14 through 21. This is a traditional presentation of address data on a bus. FIG. 3 shows the same situation, except where the column and row addresses have 9 bits. Note here that the most significant column bit is bit 14, while in FIG. 2, the most significant column bit is bit 13. The significance of this difference will be more apparent from that which is contained hereinafter. In FIG. 4 there is shown the same word configuration but with the ten column and row bits.

Returning now to FIG. 1, memories 11, and, 12 are addressable over a set of leads of address bus 101 from the processor. This address bus 101 is a 12 bit bus of which 8, 9, 10, 11 or 12 bits can be connected to the address leads of the RAMS as required. This bus has placed on it the row and column address information from the processor. It will be noted that the row bits are presented to the memory first over address bus 101, followed by presentation of the column bits over this same bus in a time multiplexed fashion. Thus, the same input lead to a memory will receive two different address bits as controlled by the processor. The precise bits of the full address which are presented on the address bus are controlled by flag register 14, and the signal on the CAMD lead. The flag register 14 determines which bits appear on the address bus at row time dependent upon the selected default memory address size. The CAMD lead determines which bits appear on the address bus at column time and is dependent upon the actual size of the addressed memory. The association for the purposes of this invention between the memory leads and the connections to the address bus are shown in FIG. 5. For timing purposes, it should be noted that at row address time, the full address (including row and column bits) is available on data bus 102. This information is not presented to the RAMS, but is used by decode logic 13 as will be seen hereinafter. At column address time, the data bus is used to transfer data to or from the RAM and does not contain the column address bits.

Thus, as shown in FIG. 5, assuming a default situation where the memory has eight bit addressing, then the memory input leads 0 through 7 would be connected to the row address bits via the address bus as shown, with lead 0 being connected to bit 14 while lead 7 is connected to bit 21. These same memory inputs would be connected to other bits of the address at column time, also as shown, so that lead 0 of the memory input would be connected to address bit 6 while memory input 7 would be connected to address bit 13. It is clear from this physical connection chart that no bits of the address are connected to the RAM twice.

Look now at the situation if a nine bit addressable memory were to be connected in the same manner. In this situation (using the 8 leads chart), address bits 14 and 6 would still go to input 0 and (skipping to the end), address bits 21 and 13 would still go to memory input 7, but address bits 22 and 14 would go to new memory input 8 (not shown). Thus, if this memory were to be wired in the same manner as the eight pin memory, address bit 14 would be used twice, as part of both the row and the column. This duplication of address bit 14 would effectively eliminate certain sections of memory from usage.

Instead of connecting the bus as just discussed, the memory leads are connected (as shown in the 9 leads chart) by shifting one position such that the 0 input of the memory is connected to address bits 15 and 6 while memory input 8 is connected to address bits 23 and 14.

In operation, then, the system works such that flag register 14 is used to indicate to the system the default memory size. In one embodiment, flag register 14 is a two-bit register with "00" indicating a default of 8 bit addressing. The connections for this are shown in FIG. 5. Flag bits "01" indicate 9 bit addressing, "10" indicates 10 bit addressing, and "11" indicates 11 bit addressing, all as the default addressing mode. The presentation of addressing bits on the address bus at row is controlled by the mode and may differ from the 8 leads default shown in FIG. 5 as will be discussed.

Decode logic 13 monitors data bus 102 for certain bits, and if these bits are found during the row address time, decode logic 13 indicates to processor 10 via the CAMD lead that the memory being addressed is not the default size. In response, during the subsequent column address time the bits on the address bus are shifted one position, as shown in FIG. 5.

Thus, reviewing FIG. 5 and assuming an address is presented to RAM 11 having eight address leads, the bits 14 through 25 (interpreted as per FIG. 2) would be presented at row time via the first eight of the twelve leads of address bus 101. These bits would be presented to inputs 0 through 7 of the memory input. At column time, bits 6 through 13 would be presented to the memory, also to inputs 0 through 7.

Now let us assume that a 9 bit address is presented to RAM 12 having nine address leads. During the row address time, the bits 14 through 25 would still be presented on address bus 101, since at this point in time, no determination can be made as to what size memory is being accessed. However, since the physical arrangement of the memory inputs as connected to the address bus 101 differs as shown in FIG. 5, then address bit 14, which in reality belongs to the column address, is not connected to any memory input at this time. This allows the first bit belonging to the row address, which is bit 15, (as shown in FIG. 3) to be presented to the first memory input lead 0. This works for each of the inputs 0 through 8 in a straightforward manner.

At column address time, processor 10, having received a signal from decode logic 13 via the CAMD lead at row address time indicating that a RAM with more than the default number of address leads is being accessed, shifts each address bit by one position on address bus 101. This is exactly in accordance with FIG. 3 and results in the proper operation of the memory.

The same analysis can be made with respect to a memory having ten address leads. As can be seen in FIG. 4, a ten bit address memory has ten contiguous bits in the row address (bits 15–24), but the column address is split into a nine bit field (bits 6–14) and a one bit field (bit 25). By splitting the column address into two fields the column address bit 10 (address bit 25) can be presented to memory lead 9 at column address time, as shown in FIG. 5. It can be seen from FIG. 5 that the column address bits 6–14 have been shifted one position and bits 15–16 have been replaced by bits 25–26 in order to accommodate memories with ten address leads. The actual bits which are replaced and the address bits which replace them are dependent upon the default memory size. FIG. 6 shows a chart of alternate arrangements for a nine input memory default size. The main difference is the address bits outputted at row address time. The other main difference is the bits which are replaced at column address time.

Flag register 14 is set from any source after reset. The row address for the flag register default information should be all "1's" or all "0's" so that the address is default mode independent.

Throughout the discussion of this embodiment, we have assumed that row addressing always proceeds column addressing. This has been done only for illustrative purposes, and of course, either way will work equally well, and this invention will support a system operating in either mode, whether it be row addressing first or column addressing first, or even if partial addressing of each comes during various cycles.

During the discussion of this invention, we have used as examples VRAM and DRAM. However, it is to be understood that many different memory types can be addressed in this manner.

Although the present invention has been described with respect to a specific preferred embodiment thereof, various changes and modifications may be suggested by one skilled in the art, and it is intended that the present invention encompass such changes and modifications as fall within the scope of the appended claims.

What is claimed is:

1. A computer system employing a logical address of 2M bits including a row address of M most significant bits separately presented during a row address time and a column address of M least significant bits separately presented during a column address time, said computer system comprising:

a data bus having N data leads;

an address bus having P physical address leads disposed in an ascending logical order, P being greater than M and less than 2M;

at least one first memory having N data leads connected to said data bus and J address input leads connected to said address bus, J being less than P-2, each first memory inputting a row address via said address input leads from a first predetermined set of physical address leads of said address bus during said row address time, inputting a column address via said address input leads from said first predetermined set of physical address leads of said address bus during said column address time, and permitting data access to a memory location corresponding to a logical address formed of said row address and column address following said column address time;

at least one second memory having N data leads connected to said data bus and J+1 address input leads connected to said address bus, each second memory inputting a row address via said address input leads from a second predetermined set of physical address leads of said address bus during said row address time, said second predetermined set of physical address leads shifted one place upward in said ascending logical order of said address bus, inputting a column address via said address input leads from said second predetermined set of physical address leads of said address bus during said column address time, and permitting data access to a memory location corresponding to a logical address formed of said row address and column address following said column address time;

a decode logic circuit connected to said data bus for generating a decode signal indicating either a default memory size or a nondefault memory size based upon signals present on said data bus during said row address time; and a processor connected to said data bus, said address bus and said decode logic circuit, said processor having means for supplying a first predetermined set of J+2 contiguous logical address bits to corresponding physical address leads of said address bus during each row address time, said first predetermined set of J+2 contiguous logical address bits beginning at a logical bit corresponding to the least significant bit of the row address of a first memory, means for supplying said logical address to said data bus during each row address time, means for supplying a second predetermined set of contiguous logical address bits to corresponding physical address leads of said address bus during each column address time if said decode signal indicates a default memory size, said second predetermined set of contiguous logical bits beginning at a logical bit corresponding to the least significant bit of said column address of a first memory, and means for supplying a third predetermined set of contiguous logical address bits to corresponding physical address leads of said address bus during each column address time if said decode signal indicates a nondefault memory size, said third predetermined set of contiguous logical address bits beginning at a logical bit corresponding to the least significant bit of said column address of a second memory and shifted upward one place in said ascending logical order of physical address leads from said second predetermined set of contiguous address bits.

2. The computer system of claim 1, wherein:

said processor further includes a flag register storing therein an indication of a default addressing mode, and said means for supplying a first predetermined set of contiguous logical address bits to corresponding physical address leads of said address bus is connected to said flag register, said first predetermined set of contiguous logical address bits corresponding to said default addressing mode.

3. The computer system of claim 1, further comprising:

at least one third memory having N data leads connected to said data bus and J+2 address input leads connected to said address bus, each third memory inputting a row address via said address input leads from a third predetermined set of physical address leads of said address bus during said row address time, said third predetermined set of physical address leads including said second predetermined set of physical address leads and an additional physical address lead one place higher in said ascending logical order, inputting a column address via said address input leads from said third predetermined set of physical address leads of said address bus during said column address time, and permitting data access to a memory location corresponding to a logical address formed of said row address and column address following said column address time;

said processor wherein said means for supplying a first predetermined set of J+2 contiguous logical address bits to corresponding physical address leads of said address bus during each row address time supplies J+3 contiguous logical address bits beginning at a logical bit corresponding to the least significant bit of said row address of a first memory, and said means for supplying a third predetermined set of contiguous logical address bits to corresponding physical address leads of said address bus during each column address time if said decode signal indicates a nondefault memory size further supplies an additional logical bit more significant that the most significant row address bit.

4. A method of addressing memories of differing sizes in a computer system employing a logical address of 2M bits including a row address of M most significant bits separately presented during a row address time and a column address of M least significant bits separately presented during a column address time, said method comprising the steps of:

connecting a first memory having J address input leads to a first predetermined set of physical address leads of an address bus having P physical address leads, J being less than P-2 connecting a second memory having J+1 address input leads to a second predetermined set of physical address leads of the address bus, said second predetermined set of physical address leads shifted one place upward in an ascending logical order of the address bus;

supplying a first predetermined set of J+2 contiguous logical address bits to corresponding physical address leads of the address bus during each row address time, said first predetermined set of J+2 contiguous logical address bits beginning at a logical bit corresponding to the least significant bit of the row address of a first memory;

supplying the logical address to a data bus during each row address time;

decoding a default memory size or a nondefault memory size based upon signals present on the data bus during the row address time;

supplying a second predetermined set of contiguous logical address bits to corresponding physical address leads of the address bus during each column address time if the decode signal indicates a default memory size, said second predetermined set of contiguous logical bits beginning at a logical bit corresponding to the least significant bit of the column address of a first memory; and supplying a third predetermined set of contiguous logical address bits to corresponding physical address leads of the address bus during each column address time if the decode signal indicates a nondefault memory size, said third predetermined set of contiguous logical address bits beginning at a logical bit corresponding to the least significant bit of the column address of a second memory and shifted upward one place in the ascending logical order of physical address leads from said second predetermined set of contiguous address bits.

5. The method of claim 4, further comprising the step of:

storing an indication of a default addressing mode; and wherein said step of supplying a first predetermined set of contiguous logical address bits to corresponding physical address leads of the address bus corresponds to said stored default addressing mode.

6. The method of claim 4, further comprising the step of:

connecting a third memory having J+2 address input leads connected to a third predetermined set of physical address leads of the address bus, said third predetermined set of physical address leads including said second predetermined set of physical address leads and an additional physical address lead one place higher in the ascending logical order;

said step of supplying a first predetermined set of J+2 contiguous logical address bits to corresponding physical address leads of the address bus during each row address time further supplies J+3 contiguous logical address bits beginning at a logical bit corresponding to the least significant bit of the row address of a first memory; and said step of supplying a third predetermined set of contiguous logical address bits to corresponding physical address leads of the address bus during each column address time if the decode signal indicates a nondefault memory size further supplies an additional logical bit more significant that the most significant row address bit.

* * * * *